May 15, 1951 W. F. FRIEDMAN 2,552,548

FACSIMILE ENCIPHERING SYSTEM

Filed March 6, 1943

INVENTOR
WILLIAM F. FRIEDMAN
BY William D. Hall.
ATTORNEY

Patented May 15, 1951

2,552,548

UNITED STATES PATENT OFFICE 2,552,548

FACSIMILE ENCIPHERING SYSTEM

William F. Friedman, Washington, D. C.

Application March 6, 1943, Serial No. 478,193

5 Claims. (Cl. 178—5.1)

(Granted under the act of March 3, 1883, as amended April 30, 1928; 370 O. G. 757)

The invention described herein may be manufactured and used by or for the Government for governmental purposes, without the payment to me of any royalty thereon.

The subject matter of this invention is a system for enciphering facsimiles.

This invention relates to means for secretly communicating information by transmitting a facsimile of the message in a graphic form of any sort such as a writing, type-writing, picture, photograph or the like. Secrecy is obtained by transmitting a series of impulses caused in part by the message to be transmitted and in part by a control in graphic form such as any writing, picture or random arrangement of dots or lines. Such a control does not necessarily have any intelligibility in itself. It operates as a random key. At the receiving end, a duplicate of this control is employed. This duplicate control is moved in synchronism with the movements of the control at the transmitting end and causes a series of impulses which co-operate with the impulses received from the transmitter, the interaction between the two series of impulses serving to produce a facsimile of the original message.

It is an object, therefore, of my invention to provide apparatus comprising a transmission system including a transmitter section and a receiver section. Each of said sections has, as a part thereof, an electric circuit including the contacts of a plurality of relays interconnected in such a way as to cause a plurality of impulses to circulate in said circuit. In the transmitter section these impulses represent the combined effects due to the message to be transmitted and to a control element. An impulse can only occur in this circuit when both of the relays have not moved their contacts to the same position. In the receiver section these impulses represent those caused by the original message, since the impulses due to the control have been removed by the use of a duplicate of the control in the receiver section.

For a further exposition of my invention reference may be had to the annexed drawings and specification at the end whereof the novel features of my invention will be specifically pointed out and claimed.

Figures 1, 2, 3:
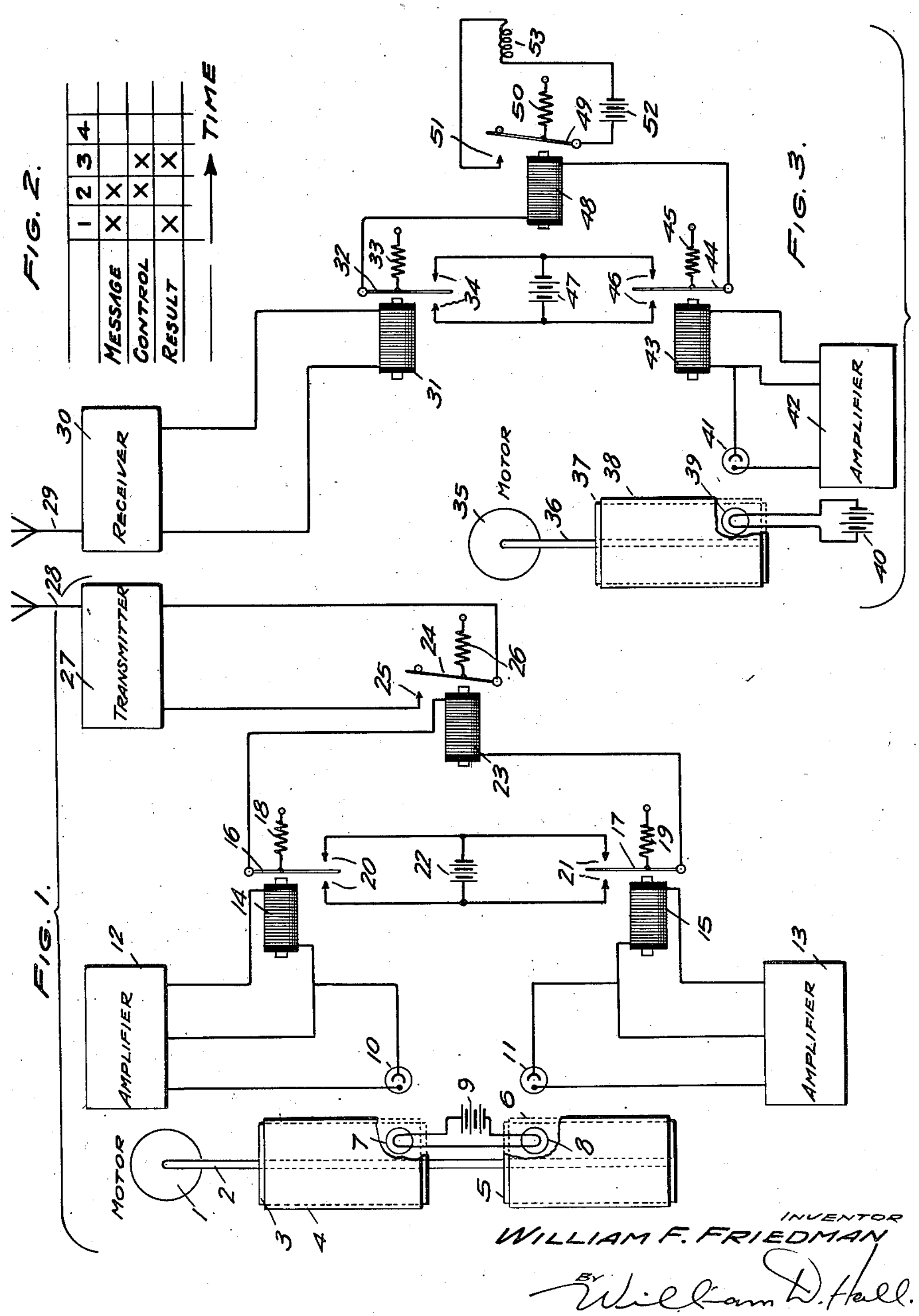
Figure 1 is a circuit diagram of the transmitter with parts designated by blocks bearing appropriate labels.
Figure 2 is a tabulation illustrating the impulses comprising the intelligence transmitted.
Figure 3 is a circuit diagram of the receiver in block form.

In the one embodiment of my invention which has been selected from among others, my device is shown as comprising a transmitter section having a motor 1 driving shaft 2 carrying transparent drum 3 surrounded by message sheet 4 and also carrying transparent drum 5 surrounded by control sheet 6. Within drums 3 and 5 are located electric lamps 7 and 8 which serve as sources of light and which are energized from a source of electricity 9. Opposite lamps 7 and 8 so as to receive a beam of light therefrom and, respectively, under the control of message sheet 4 and control sheet 6, are located light-sensitive cells 10 and 11 which form parts of circuits including amplifiers 12 and 13 and relay coils 14 and 15. These relays also include movable contacts 16 and 17 biased in one direction by springs 18 and 19 and, in the other direction, by coils 14 and 16, respectively, when these coils are energized, and engaging one or the other of stationary contacts 20 and 21. Contacts 16, 17, 20 and 21 form parts of a circuit, including a source of current 22 and relay coil 23, which, when energized, attracts movable contact 24 into engagement with stationary contact 25, overcoming the pull of spring 26. Contacts 24 and 25 control a circuit including transmitter 27 having an output element 28, shown as an antenna.

At the place to which it is desired to transmit the intelligence, there is located a receiving system having a receiving element, indicated as an antenna 29, forming part of receiver 30 which is connected into circuit so as to control relay coil 31. This relay also includes movable contact 32 stressed away from coil 31 by spring 33 and co-operating with stationary contacts 34. Motor 35 drives shaft 36 carrying transparent drum 37 surrounded by second control sheet 38, which is a duplicate of control sheet 6. Within drum 37 is located electric lamp 39, energized by a source of electricity 40. Opposite lamp 39 so as to receive a beam of light therefrom under the control of second control sheet 38, is located light-sensitive cell 41 which forms a part of a circuit including amplifier 42 and relay coil 43. This relay also includes movable contact 44 biased in one direction by spring 45 and, in the other direction, by coil 43, when this coil is energized, so as to engage one or the other of stationary contacts 46. Contacts 34 and 46 form parts of a circuit including a source of electricity 47 and a relay coil 48. This relay includes movable contact 49 stressed away from coil 48 by spring 50 and co-operating with stationary contact 51. Contacts 49 and 51 are parts of a circuit including a source of electricity 52 and coil 53, which is the operating element of a facsimile reproducer of any convenient type.

The operation of my device is as follows: The message and the control sheets are in any graphic form such as a writing, printing, drawing, photograph or the like. They may be said to consist of pluralities of spots or elemental parts each of which is either black or white depending upon the part of the message which it forms. Relative movement is provided between lamp 7 and message sheet 4, between lamp 8 and control sheet 6, and between lamp 39 and second control sheet 38 in any convenient manner heretofore used in the art of facsimile transmission. This causes the beam of light emitted by each lamp to scan every spot or element of the message or control associated with it. In the transmitter this scanning thus produces a series of impulses in the amplifying circuits through the action of the light sensitive cells 10 and 11. For convenience of description, these impulses can be said to be produced by black spots in the message or control. Thus coils 14 and 15 are energized every time an impulse occurs in the amplifying circuit associated therewith. The action of the relays controlled by these coils produces in the circuit associated with them a series of impulses distributed in time as shown in Figure 2 of the drawings in which the term "X" represents an impulse. This figure shows the four possible cases. Thus it will be seen in column 1 that energizing coil 14 by message sheet 4 without energizing coil 15 by control sheet 6 causes an impulse in the circuit containing coil 23 and labeled "Result" in Figure 2. This energizes coil 23 and causes transmitter 27 to emit an impulse. As seen in column 2, when both coils 14 and 15 are energized no impulse appears in the circuit containing coil 23. As seen in column 3, energizing coil 15 but not energizing coil 14 causes an impulse in the circuit containing coil 23. Column 4 shows that when no impulse is present in either amplifier 12 or 13 and, consequently, neither coil 14 nor 15 is energized, no impulse appears in the circuit containing coil 23. To put it another way, an impulse only appears in coil 23 and, therefore, an impulse is only sent out from transmitter 27, when coils 14 and 15 are not in the same condition, i. e., are not simultaneously energized or de-energized. This is due to the fact that simultaneous energization or de-energization of coils 14 and 15 causes movable contacts 16 and 17 to engage stationary contacts 20 and 21, respectively, which are connected to the same side or polarity of source 22.

The series of impulses emitted by the output element 28 of transmitter 27 is received by the input element 29 of receiver 30. Each impulse so received energizes coil 31. Motor 35 produces relative movement between second control sheet 38 and light 39 so that control sheet 38 is scanned in synchronism with control sheet 6. Since second control sheet 38 is a duplicate of control sheet 6, coil 43 is energized in synchronism with the energizations of coil 15. Referring again to Figure 2, the line labeled "Result" represents the impulses which pass through receiver 30 and energize coil 31, while the line labeled "Control" represents the simultaneous impulses caused by control sheet 38 and which energize coil 43. Figure 2, column 1, shows that when there is an impulse in coil 31 and none in coil 43, an impulse is produced in coil 48, which is represented in Figure 2 by the line labeled "Message." Following through the other columns of Figure 2 shows that when coils 31 and 43 are simultaneously energized or de-energized, no impulse appears in coil 48. Likewise, while either coil 31 or 43 is energized when the other is de-energized, coil 48 is energized. The energization of coil 48 causes coil 53 to be energized and coil 53 operates a stylus or other marking mechanism and thus message sheet 4 is reproduced.

It will be understood that, whereas the foregoing description calls for the transmission of a signal when one only of the coils 14 and 15 is energized, the apparatus will function just as well and achieve just as great privacy if rearranged slightly, as by giving an opposite bias, a normal closed condition, to switch 24—25. In such case, of course, a signal will be transmitted whenever coils 14—15 are in the same condition instead of when they are in different conditions.

I claim:

1. Means for secretly transmitting graphic information, said means comprising, a message in graphic form which it is desired to transmit, a scanner arranged to scan and reproduce said message as a series of electric impulses of varying intensity, a screen having varying portions, a second scanner arranged to scan and reproduce the variations of said screen as a second series of electric impulses of varying intensity, a relay connected under the control of said scanner and arranged to be moved by each of said impulses to one of two positions, a second relay connected under the control of said second scanner and arranged to be moved by each of said second impulses to one of two positions, an electric circuit including parts of said relays and adapted to be closed only when there is instantaneously an impulse in either series but not in the other, a transmitter connected under the control of said electric circuit so as to emit impulses whenever said circuit is closed, a receiver arranged to receive the impulses emitted by said transmitter and having an output comprising a third series of electrical impulses of varying intensity, a second screen duplicating said first mentioned screen, a third scanner arranged to scan synchronously with the scanning of said second scanner and reproduce the variations of said second screen as a fourth series of electric impulses of varying intensity, an electromechanical interlock connected under the control of said third and of said fourth series of impulses and arranged to be energized whenever an impulse occurs in one of said third and fourth series and no impulse occurs simultaneously in the other of said third and fourth series, and a recorder connected under the control of said interlock and arranged to operate whenever said interlock is energized and to thereby reproduce said message.

2. Means for secretly transmitting graphic information, said means comprising, a message in graphic form which it is desired to transmit, a scanner arranged to scan and reproduce said message as a series of electric impulses of varying intensity, a screen having varying portions, a second scanner arranged to scan and reproduce the variations of said screen as a second series of electric impulses of varying intensity, an electromechanical interlock connected under the control of both of said series of impulses and arranged to be energized whenever an impulse occurs in one of said series and does not occur simultaneously in the other of said series, a transmitter connected under the control of said interlock so as to emit impulses whenever said interlock is energized, a receiver arranged to receive the impulses emitted by said transmitter and having an output comprising a third series of electrical impulses of varying intensity, a second screen duplicating said first mentioned screen, a third scanner arranged to scan synchronously with the scanning of said second scanner and reproduce the variations of said second screen as a fourth series of electric impulses of varying intensity, a second electro-mechanical interlock connected under the control of said third and of said fourth series of impulses and arranged to be energized whenever an impulse occurs in one of said third and fourth series and no impulse occurs simultaneously in the other of said third and fourth series, and a recorder connected under the control of said second interlock and arranged to operate whenever said second interlock is energized and to thereby reproduce said message.

3. Means for secretly transmitting graphic information, said means comprising, a message in graphic form which it is desired to transmit, a scanner arranged to scan and reproduce said message as a series of electric impulses of varying intensity, a screen having varying portions, a second scanner arranged to scan and reproduce the variations of said screen as a second series of electric impulses of varying intensity, a relay connected under the control of said scanner and arranged to be moved by each of said impulses to one of two positions, a second relay connected under the control of said second scanner and arranged to be moved by each of said second impulses to one of two positions, an electric circuit including parts of said relays and adapted to be closed only when there is instantaneously an impulse in either series but not in the other, a transmitter connected under the control of said electric circuit so as to emit impulses whenever said circuit is closed, a receiver arranged to receive the impulses emitted by said transmitter and having an output comprising a third series of electrical impulses of varying intensity, a second screen duplicating said first mentioned screen, a third scanner arranged to scan synchronously with the scanning of said second scanner and reproduce the variations of said second screen as a fourth series of electric impulses of varying intensity, a third relay connected under the control of said third scranner and arranged to be moved by each of said impulses of said fourth series to one of two positions, a fourth relay connected under the control of said receiver and arranged to be moved by each of said impulses of said third series to one of two positions, an electric circuit including parts of said relays and adapted to be closed only when there is instantaneously an impulse in either said third or said fourth series but not in the other, and a recorder connected under the control of said circuit and arranged to be energized whenever said circuit is closed to record the original message.

4. In an apparatus of the nature described for transmitting graphic information, means for scanning a message to be transmitted to derive therefrom an electric signal irregularly assuming a succession of values responsive to the photographic density of the message at the point of scanning, means for substantially simultaneously scanning a camouflage message to derive a second electric signal irregularly assuming a succession of values depending upon the photographic density of the camouflage message at the point of scanning the second said electric signal being nonsynchronous with the first with respect to the variations therein, a switch having two circuit-closing positions, means for causing said switch to assume one of its circuit-closing conditions when said first-mentioned electric signal assumes one value and the other of its circuit-closing conditions when the said first-mentioned signal assumes another of its values, a second switch having two circuit-closing conditions, and means for controlling said switch responsive to said second electric signal, a third switch, a control circuit for said third switch said circuit serving to close said switch when the first-mentioned two switches are in predetermined circuit-closing positions only, and means for transmitting a signal when said third switch is in closed condition.

5. Means for secretly transmitting graphic information comprising a device for scanning a message to be transmitted and reproducing said message as a series of electric impulses of varying intensity, a second device for scanning a camouflage message and reproducing the same as a series of electric impulses of varying intensity the impulses of said second series being non-synchronous with the impulses of the said first series, a relay connected under the control of said first device and arranged to be moved by each of said impulses to one of two positions, a second relay connected under the control of said second device and arranged to be moved by each of the impulses of said second series of said impulses to one of two positions, an electric circuit including said relays adapted to be closed only when predetermined combinations of closed positions in said relays occur simultaneously, and a transmitter connected under the control of said electric circuit so as to emit impulses only whenever said circuit is closed.

WILLIAM F. FRIEDMAN.

REFERENCES CITED

The following references are of record in the file of this patent:

UNITED STATES PATENTS

| Number | Name | Date |
|---|---|---|
| 1,310,719 | Vernam | July 22, 1919 |
| 1,312,574 | Pierce | Aug. 12, 1919 |
| 1,657,366 | Belin | Jan. 24, 1928 |
| 1,763,358 | Jenkins | June 10, 1930 |
| 1,848,839 | Ranger | Mar. 8, 1932 |
| 1,868,967 | Cartier | July 26, 1932 |
| 2,300,664 | Francis | Nov. 3, 1942 |